(12) United States Patent
Suh et al.

(10) Patent No.: US 7,526,035 B2
(45) Date of Patent: Apr. 28, 2009

(54) APPARATUS AND METHOD FOR SWITCHING BETWEEN AN AMC MODE AND A DIVERSITY MODE IN A BROADBAND WIRELESS COMMUNICATION SYSTEM

(75) Inventors: Chang-Ho Suh, Seongnam-si (KR); Young-Kwon Cho, Suwon-si (KR); Su-Ryong Jeong, Suwon-si (KR); Seok-Hyun Yoon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 584 days.

(21) Appl. No.: 11/098,679

(22) Filed: Apr. 4, 2005

(65) Prior Publication Data

US 2005/0238108 A1 Oct. 27, 2005

(30) Foreign Application Priority Data

Apr. 7, 2004 (KR) .................. 10-2004-0023631

(51) Int. Cl.
*H04K 1/10* (2006.01)
(52) U.S. Cl. .................. 375/260; 375/267; 375/148; 375/138; 375/132
(58) Field of Classification Search .......... 375/347, 375/346, 232, 260, 148, 141, 299; 370/318, 370/335; 455/67.11
See application file for complete search history.

(56) References Cited

U.S. PATENT DOCUMENTS

| | | | |
|---|---|---|---|
| 5,465,276 A * | 11/1995 | Larsson et al. | 375/346 |
| 6,112,094 A | 8/2000 | Dent | |
| 6,545,997 B1 | 4/2003 | Bohnke et al. | |
| 6,603,745 B1 * | 8/2003 | Antonio et al. | 370/318 |
| 6,920,192 B1 * | 7/2005 | Laroia et al. | 375/347 |
| 6,985,469 B2 * | 1/2006 | Leung | 370/335 |
| 2003/0232601 A1 * | 12/2003 | Uno | 455/67.11 |
| 2006/0114981 A1 * | 6/2006 | Ghosh et al. | 375/232 |

FOREIGN PATENT DOCUMENTS

JP 2002-124900 4/2002

OTHER PUBLICATIONS

Czylwik; Degradation of multicarrier and single carrier transmission with frequency domain equalization due to pilot-aided channel estimation and frequency synchronization; IEEE 1997; pp. 27-31.*
Czylwik; Adaptive OFDM for wideband radio channels; IEEE 1996; pp. 713-718.*

* cited by examiner

*Primary Examiner*—Sudhanshu C Pathak
(74) *Attorney, Agent, or Firm*—The Farrell Law Firm, PC

(57) ABSTRACT

An apparatus and method for switching between an AMC mode and a diversity mode adaptively according to a channel environment in a broadband wireless communication system are provided. According to the present invention, a transmitter (a base station) determines a transmission mode according to frequency-domain and time-domain channel measurement information received from a receiver (a mobile station). If the transmission mode is the AMC mode, the transmitter selects a coding and modulation scheme according to a frequency-domain CQI received from the receiver. If the transmission mode is a diversity mode, the transmitter selects a predetermined coding and modulation scheme.

11 Claims, 12 Drawing Sheets

APPARATUS AND METHOD FOR SWITCHING BETWEEN AN AMC MODE AND A DIVERSITY MODE IN A BROADBAND WIRELESS COMMUNICATION SYSTEM

PRIORITY

This application claims priority under 35 U.S.C. § 119 to an application entitled "Apparatus And Method For Switching Between AMC Mode And Diversity Mode In A Broadband Wireless Communication System" filed in the Korean Intellectual Property Office on Apr. 7, 2004 and assigned Serial No. 2004-23631, the contents of which are herein incorporated by reference.

BACKGROUND OF THE INVENTION

1. Field of the Invention

The present invention relates generally to an apparatus and method for switching between an AMC (Adaptive Modulation and Coding) mode and a diversity mode in an OFDMA-CDM (Orthogonal Frequency Division Multiple Access-Code Division Multiplexing), and in particular, to an apparatus and method for adaptively applying an AMC mode or a diversity mode according to a channel environment.

2. Description of the Related Art

Recently having gained prominence in high-speed data transmission over wired/wireless channels, OFDM (Orthogonal Frequency Division Multiplexing) is a special case of MCM (Multi-Carrier Modulation). In OFDM, a serial symbol sequence is converted to parallel symbol sequences and modulated to mutually orthogonal sub-carriers or sub-channels, prior to transmission.

The first MCM systems appeared in the late 1950's for military HF (High Frequency) radio communication, and OFDM with overlapping orthogonal sub-carriers was initially developed in the 1970's. However, because of the difficulty in orthogonal modulation between multiple carriers, OFDM has limitations in applications for real systems.

However, in 1971, Weinstein, et al. proposed an OFDM scheme that applies DFT (Discrete Fourier Transform) to parallel data transmission as an efficient modulation/demodulation process, which was a driving force behind the development of OFDM. Also, the introduction of a guard interval and a cyclic prefix as a specific guard interval further mitigated the adverse effects of multi-path propagation and delay spread on systems.

Accordingly, OFDM has now been utilized in wide fields of digital data communications such as DAB (Digital Audio Broadcasting), digital TV broadcasting, WLAN (Wireless Local Area Network), and WATM (Wireless Asynchronous Transfer Mode). Although hardware complexity was an obstacle to the widespread use of OFDM, recent advances in digital signal processing technology including FFT (Fast Fourier Transform) and IFFT (Inverse Fast Fourier Transform) have enabled easier OFDM implementation.

OFDM, similar to FDM (Frequency Division Multiplexing), boasts optimum transmission efficiency in high-speed data transmission because it transmits data on sub-carriers, while maintaining orthogonality among them. Especially, efficient frequency use attributed to overlapping frequency spectrums, and robustness against frequency selective fading and multi-path fading further increases the transmission efficiency in the high-speed data transmission.

OFDM reduces the effects of ISI (Inter-Symbol Interference) by use of guard intervals and enables design of a simple equalizer hardware structure. Furthermore, because OFDM is robust against impulsive noise, it is increasingly utilized in communication system configurations.

OFDMA-CDM is a communication scheme in which the total available frequency band is divided into a plurality of sub-frequency bands and data that is mapped onto the sub-frequency bands is spread with a predetermined spreading factor, prior to transmission.

Traditionally, the OFDMA-CDM system uses an AMC mode or a diversity mode alone. The AMC mode uses an adaptive modulation and coding scheme (MCS) level according to a channel state and the diversity mode uses a fixed MCS level. It was also proposed that a predetermined frequency band or time band is allocated for the AMC mode and a random frequency band is allocated for a non-AMC mode.

Systems using only the AMC mode or the diversity mode have limitations in achieving optimum performance according to a channel state. Given a large coherence bandwidth and a long coherence time, the AMC-mode system achieves an optimum performance, but the diversity-mode system has merely a slight performance gain. Under the opposite channel environment, that is, with a narrow coherence bandwidth and a short coherence time, the diversity-mode system achieves the optimum performance, while the AMC-mode system obtains a minimal performance gain.

Accordingly, the technique of allocating a predetermined frequency or time domain for the AMC mode and a random frequency band for the diversity mode, respectively, is not effective in terms of channel use efficiency. If a channel in a different frequency band is good, relative to a channel in the frequency band allocated for the AMC mode, the AMC mode operation continuously experiences the bad channel because the allocated frequency band does not change.

SUMMARY OF THE INVENTION

Accordingly, the present invention has been designed to substantially solve at least the above problems and/or disadvantages and to provide at least the advantages below. An object of the present invention is to provide an apparatus and method for adaptively applying an AMC mode or a diversity mode according to a channel environment in an OFDMA-CDM system.

Another object of the present invention is to provide an apparatus and method for adaptively applying an AMC mode or a diversity mode based on feedback information received from a mobile station in a base station in an OFDMA-CDM system.

A further object of the present invention is to provide an apparatus and method for feeding back time-frequency channel measurement information to a base station in a mobile station in an OFDMA-CDM system.

The above and other objects are achieved by providing an apparatus and method for adaptively switching between an AMC mode and a diversity mode according to a channel environment in a broadband wireless communication system.

According to an aspect of the present invention, in a communication method for a mobile station in a broadband wireless communication system in which a total frequency band of sub-carriers is divided into a plurality of sub-bands, the mobile station generates channel estimates of each of the sub-bands for a predetermined time period using a received signal, calculates a channel mean (A) and a channel secondary statistical value (B) in frequency-domain of each of the sub-bands using the generated channel estimates, calculates a channel secondary statistical value (C) in time-domain of at least one of the sub-bands using the generated channel estimates, and transmits, to a base station, channel measurement information including the calculated one or more mean value(s) (A), the calculated one or more secondary statistical value(s) (B), and the calculated one or more secondary statistical value(s) (C).

According to another aspect of the present invention, a transmission method in a broadband wireless communication system in which a total frequency band of sub-carriers is divided into a plurality of sub-bands and frame cells (FCs) are defined, each FC corresponding to resources defined by one sub-band and a predetermined time period comprises the steps of determining a transmission mode based on frequency-domain channel measurement information and time-domain channel measurement information received from a receiver, selecting a coding and modulation scheme according to a frequency-domain channel quality indicator (CQI) received from the receiver, if the determined transmission mode is a first mode, and selecting a predetermined coding and modulation scheme, if the determined transmission mode is a second mode.

According to a further aspect of the present invention, a transmitting apparatus in an orthogonal frequency division multiple access-code division multiplexing (OFDMA-CDM) system in which a total frequency band of sub-carriers is divided into a plurality of sub-bands and frame cells (FCs) are defined, each of the FCs corresponding to resources defined by one sub-band and a predetermined time period, and having at least one time-frequency cell (TFC) being a data transport unit, comprises a transmission mode decider for determining a transmission mode based on frequency-domain channel measurement information and time-domain channel measurement information received from a receiver, and a coder and modulator for selecting a coding and modulation scheme according to a frequency-domain channel quality indicator (CQI) received from the receiver, if the determined transmission mode is a first mode, selecting a predetermined coding and modulation scheme, if the determined transmission mode is a second mode, and encoding and modulating input transmission data in the selected coding and modulation scheme.

According to still another aspect of the present invention, A mobile station apparatus in a broadband wireless communication system in which a total frequency band of sub-carriers is divided into a plurality of sub-bands, comprises a channel estimation unit for generating channel estimates of each of the sub-bands for a predetermined time period using a received signal, a frequency-domain channel measuring unit for calculating a mean (A) and a secondary statistical value (B) of each of the sub-bands in frequency-domain using the generated channel estimates, a time-domain channel measuring unit for calculating a secondary statistical value (C) of at least one of the sub-bands in time-domain and a transmitter for transmitting to a base station channel measurement information including the calculated one or more mean value(s) (A), the calculated one or more secondary statistical value(s) (B), and the calculated one or more secondary statistical value(s) (C).

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail because they would obscure the invention in unnecessary detail.

The present invention provides a scheme for adaptively using an AMC mode or a diversity mode according to a channel environment in an OFDMA-CDM system. In accordance with the present invention, channel environments are classified into two types depending on coherence bandwidth and coherence time, and the AMC mode or the diversity mode is selected adaptively according to the channel environments. Coherence bandwidth refers to the range of frequencies over which the channel impulse response remains unchanged, and coherence time refers to the time duration over which the channel impulse response remains unchanged. As the coherence bandwidth and the coherence time are larger, the channel state is better.

In the diversity mode, transmission data is hopped both in time and in frequency according to a predetermined rule. In the AMC mode, an MCS is adaptively selected according to feedback information, in addition to the time-frequency hopping at the same time. The present invention is characterized in that the AMC mode is selected in a good time-frequency channel state, and the diversity mode in a bad channel state in at least one of time and frequency.

Figure 1:
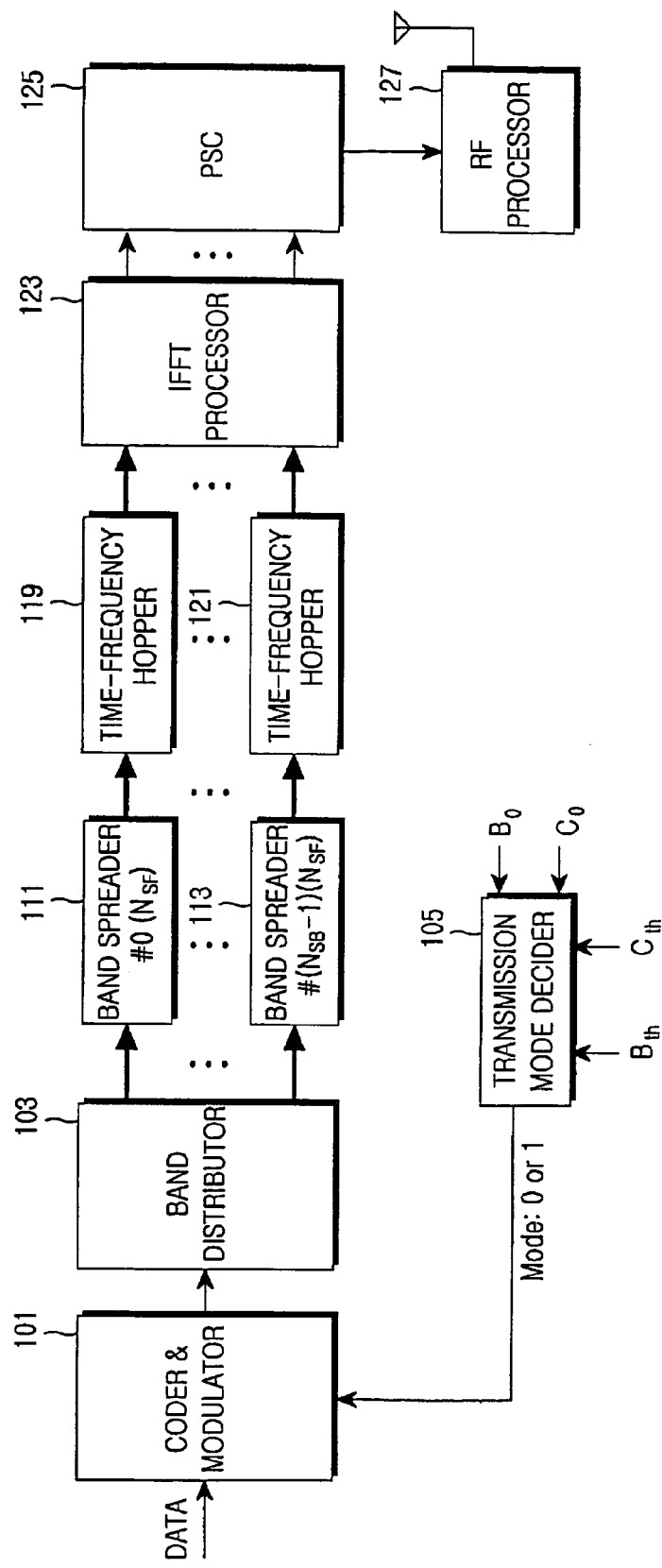
FIG. 1 is a block diagram illustrating an apparatus in a base station, for determining a transmission mode according to feedback information from a mobile station in an OFDMA-CDM system according to an embodiment of the present invention.

FIG. 1 is a block diagram illustrating an apparatus in a base station, for determining a transmission mode according to feedback information from a mobile station in an OFDMA-CDM system according to an embodiment of the present invention. The base station apparatus is provided with a transmission mode decider 105 for selecting a transmission mode, i.e., the AMC mode or the diversity mode, according to feedback information from the mobile station according to the present invention.

Referring to FIG. 1, the transmission mode decider 105 selects the AMC mode (MODE=0) or the diversity mode (MODE=1) based on feedback information [$B_0$, $C_0$] from the mobile station and predetermined thresholds [$B_{th}$, $C_{th}$]. $B_0$ is a channel variation in frequency and $C_0$ is a channel variation in time. The generation of $B_0$ and $C_0$ will be described later in more detail with reference to FIGS. 5 and 6, respectively.

$B_{th}$ is a frequency-domain channel variation threshold and $C_{th}$ is a time-domain channel variation threshold. $B_0$, representing the frequency-domain channel state, decreases with an increase in coherence bandwidth and $C_0$, representing the time-domain channel state, decreases with an increase in coherence time. When the channel state is good both in time and in frequency, the transmission mode decider 105 selects the AMC mode, and if the channel state is bad in at least one of time and frequency, it selects the diversity mode. The transmission mode selection will be detailed later with reference to FIG. 4.

For MODE=0, a coder & modulator 101 operates in the AMC mode and generates an AMC level corresponding to the channel state. For MODE=1, the coder & modulator 101 operates in the diversity mode and generates the lowest of available AMC levels. More specifically, in the AMC mode operation, the coder & modulator 101 decides on an AMC level (i.e. MCS level) using a CQI $A_0$ in addition to $B_0$ and $C_0$. How the CQI is generated will be described in greater detail with reference to FIG. 5.

The coder & modulator 101 can be configured to include a channel coder, a channel interleaver, and a modulator. For example, the channel coder is a Turbo coder for encoding input data at a code rate corresponding to the determined AMC level. The channel interleaver interleaves the coded data in a predetermined interleaving method. The modulator modulates the interleaved data in a modulation scheme corresponding to the AMC level. The modulation scheme can be QPSK (Quadrature Phase Shift Keying), 8PSK (8-ary PSK), 16QAM (16-ary Quadrature Amplitude Modulation), or 64QAM (64-ary QAM). The lowest AMC level can be a code rate of ⅓ and QPSK, for example.

Figure 3:
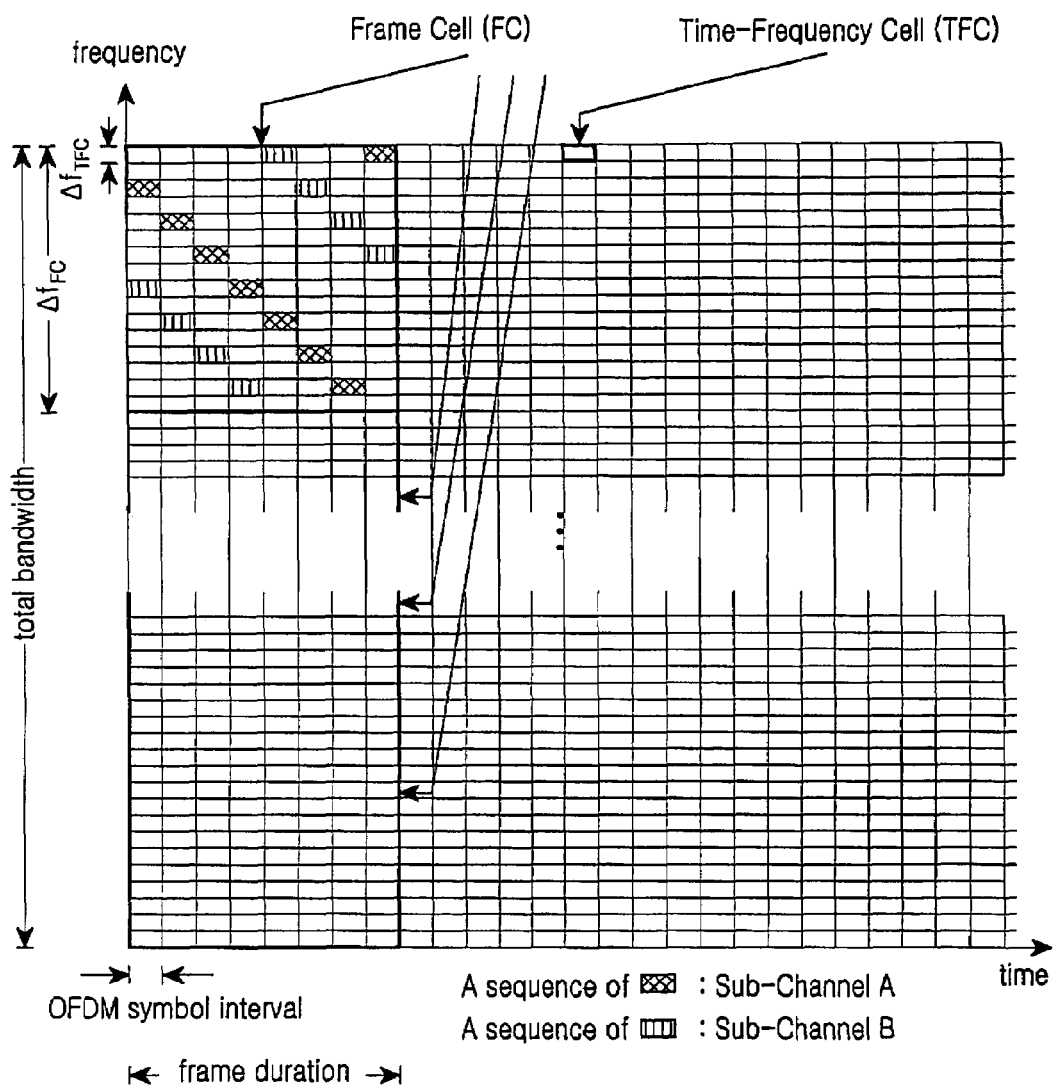
FIG. 3 illustrates segmentation of time-frequency resources in the OFDMA-CDM system according to the present invention.

A band distributor 103 parallelizes the modulation symbols received from the coder & modulator 101 and distributes the parallel modulation symbols to band spreaders 111 to 113 to which predetermined sub-bands have been allocated. As illustrated in FIG. 3, the total available bandwidth is divided into a plurality of sub-bands $\Delta f_{FC}$ and the band spreaders 111 to 113 are matched to the sub-bands in a one-to-one correspondence.

The band spreaders 111 to 113 spread the received modulation symbols with different spreading codes, e.g. Walsh codes of length 8, and sum the spread chip data. One of eight Walsh codes can be used to spread pilot symbols. If the SF (Spreading Factor) of the spreading codes is '1', the band spreaders 111 to 113 are deactivated, which implies that the system illustrated in FIG. 1 operates in OFDMA.

Time-frequency hoppers 119 to 121 map the spread data received from their matched band spreaders 111 to 113 to predetermined time-frequency areas. The time-frequency data mapping will be described later in great detail with reference to FIGS. 3 and 7.

Meanwhile, the time-frequency mapping information is delivered to the mobile station in a frame cell designated to transmit control information, such that the mobile station can identify accurate resources loaded with data (time-frequency area positions or time-frequency cell (TFC) positions).

An N-point IFFT processor 123 IFFT-processes the data from the time-frequency hoppers 119 to 121, for OFDM modulation. N is the number of the sub-carriers of the total frequency band. A parallel-to-serial converter (PSC) 125 serializes the parallel IFFT signals. An RF (Radio Frequency) processor 127 converts the serial digital signal received from the PSC 125 to an analog signal, converts the baseband analog signal to an RF signal, and transmits the RF signal through an antenna.

Figure 2:
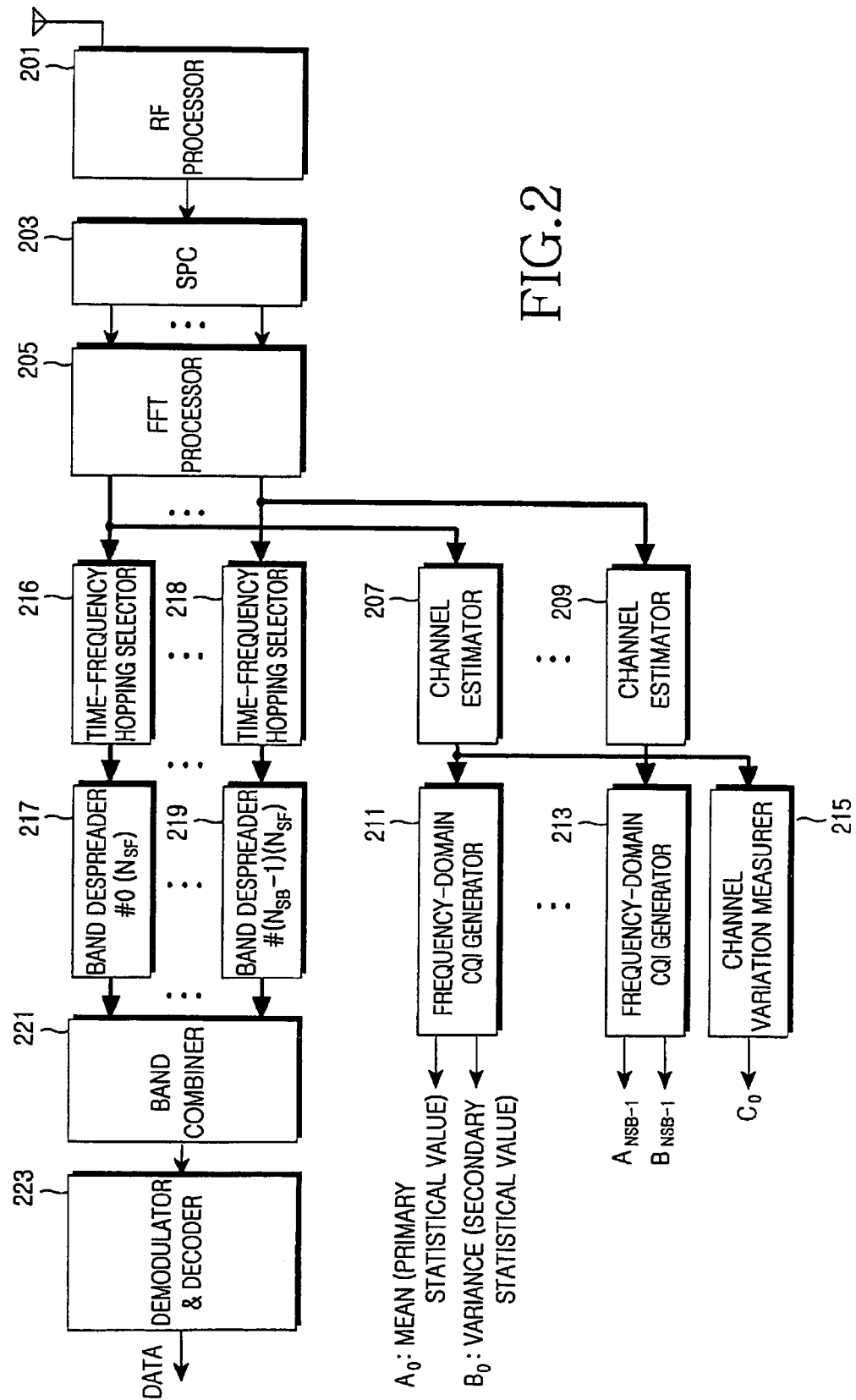
FIG. 2 is a block diagram illustrating an apparatus in the mobile station, for feeding back channel measurement information to the base station in the OFDMA-CDM system according to an embodiment of the present invention.

FIG. 2 is a block diagram illustrating an apparatus in the mobile station, for feeding back channel measurement information to the base station in the OFDMA-CDM system according to an embodiment of the present invention. The mobile station apparatus is characteristically provided with frequency-band CQI generators 211 to 213 for generating frequency-domain channel measurement information, and a channel variation measurer 215 for generating time-domain channel measurement information.

Referring to FIG. 2, an RF processor 201 converts an RF signal received through an antenna to a baseband signal and converts the baseband analog signal to a digital signal. A serial-to-parallel converter (SPC) 203 parallel converts the serial data received from the RF processor 201. An N-point FFT processor 205 FFT-processes the parallel data and distributes the resulting OFDM-demodulated data to time-frequency hopping selectors 216 to 218 and channel estimators 207 to 209 according to predetermined sub-bands. For example, OFDM-demodulated data in sub-band #0 is provided to the time-frequency hopping selector 216 and the channel estimator 207, and OFDM-demodulated data in the last sub-band to the time-frequency hopping selector 218 and the channel estimator 209.

The time-frequency hopping selectors 216 to 218 each detect data in predetermined time-frequency areas from the received data (and output the data to the corresponding band despreader 217 to 219). The time-frequency area or TFC positions are known from the control information received from the base station, as stated earlier.

The channel estimator 207 extracts pilot signals or predetermined data from the received FFT signal and estimates the channel values of sub-band #0 for a predetermined time period from the extracted data. The channel estimates are expressed as shown in Equation (1), $$\begin{bmatrix} H_0(t) \\ H_1(t) \\ \vdots \\ H_{M-1}(t) \end{bmatrix}, \begin{bmatrix} H_0(t+T_s) \\ H_1(t+T_s) \\ \vdots \\ H_{M-1}(t+T_s) \end{bmatrix}, \dots, \begin{bmatrix} H_0(t+(N_F-1)T_s) \\ H_1(t+(N_F-1)T_s) \\ \vdots \\ H_{M-1}(t+(N_F-1)T_s) \end{bmatrix} \quad (1)$$

where M denotes the number of sub-carriers per sub-band and $N_F$ denotes a time window used for measuring channel variations in time. The size of the time window is expressed in units of OFDM symbols. In an embodiment of the present invention, $N_F$ is defined as the number of OFDM symbols per frame. $T_S$ is the time duration of one OFDM symbol.

In the same manner, the channel estimator 209 calculates the channel estimates of sub-band # ($N_{SB}$-1) using Equation (2).

$$\begin{bmatrix} H_{M\times(N_{SB}-1)}(t) \\ H_{M\times(N_{SB}-1)+1}(t) \\ \vdots \\ H_{M\times N_{SB}-1}(t) \end{bmatrix}, \begin{bmatrix} H_{M\times(N_{SB}-1)}(t+T_s) \\ H_{M\times(N_{SB}-1)+1}(t+T_s) \\ \vdots \\ H_{M\times N_{SB}-1}(t+T_s) \end{bmatrix}, \dots, \qquad (2)$$

$$\begin{bmatrix} H_{M\times(N_{SB}-1)}(t+(N_F-1)T_s) \\ H_{M\times(N_{SB}-1)+1}(t+(N_F-1)T_s) \\ \vdots \\ H_{M\times N_{SB}-1}(t+(N_F-1)T_s) \end{bmatrix}$$

The thus-calculated channel estimates are provided to the frequency-domain CQI generators 211 to 213 and the time-domain channel variation measurer 215.

The frequency-domain CQI generator 211 calculates both the mean $A_0$ and the variance $B_0$ (secondary statistical value) of frequency-domain channel state values using the channel estimates expressed in Equation (1). The variance $B_0$ represents a channel variation in frequency and the coherence bandwidth decreases with an increase in $B_0$. $A_0$ and $B_0$ are fed back to the transmitter for determining the transmission mode (AMC mode or diversity mode), which will be described in more detail with reference to FIG. 5.

Similarly, the frequency-domain CQI generator 213 calculates both the mean $A_{N_{SB}-1}$ and variance $B_{N_{SB}-1}$ (secondary statistical value) of frequency-domain channel state values using the channel estimates expressed in Equation (2).

The channel variation measurer 215 calculates a time-domain variance $C_0$ (secondary statistical value) using the channel estimates expressed in Equation (1). The variance $C_0$ represents a channel variation in time and the coherence time decreases with an increase in $C_0$. $C_0$ is also fed back to the transmitter for determining the transmission mode (AMC mode or diversity mode), which will be detailed with reference to FIG. 6.

Accordingly, the mobile station measures the channel state of the total bandwidth and reports the channel state measurements to the base station. The base station then allocates a sub-band at a good channel state to the mobile station based on the report and adaptively determines the transmission mode (AMC mode or diversity mode) using the channel measurements of the allocated sub-band (e.g., sub-band in use for communications).

Regarding data recovery, a band despreader 217 for sub-band #0 despreads the data received from its matched time-frequency hopping selector 216 with predetermined spreading codes (e.g. Walsh codes). Similarly, a band despreader 219 for sub-band #($N_{SB}$−1) despreads the data received from its matched time-frequency hopping selector 218 with the spreading codes. A band combiner 221 receives the despread data symbols from the band despreaders 217 to 219 and selects the output of the band despreader that operates for the sub-band which has delivered the transmitted signal from the transmitter. A demodulator & decoder 223 demodulates the symbol data received from the band combiner 221 in accordance with a predetermined modulation scheme and decodes the demodulated data at a predetermined code rate, thereby recovering the original data.

FIG. 3 illustrates time-frequency areas to which data is mapped in the OFDMA-CDM system according to an embodiment of the present invention. Referring to FIG. 3, a unit square called a TFC is defined by a predetermined number of sub-carriers and one OFDM symbol period. Also a frame cell (FC) is defined as a time-frequency area having a bandwidth of 16 times that of one TFC and a time duration of 8 times that of one TFC. FCs illustrated in FIG. 3 are divided into FCs for delivering packet data and FCs for delivering control information about sub-channels, which carry the packet data. In an FC used for packet data transmission, two different sub-channels hop a predetermined number of frequency intervals over time. The two sub-channels show a very regular frequency hopping pattern to which the present invention is not limited.

In FIG. 3, time domain is represented on the x axis and frequency domain is represented on the y axis. For better understanding of the present invention, some terms will be defined below.

TFC (Time-Frequency Cell): resources defined by an OFDM symbol period and a frequency interval of $\Delta f_{FC}$. The TFC is a basic unit for data mapping.

FC (Frame Cell): resources defined by a plurality of OFDM symbol periods and a plurality of frequency intervals $\Delta f_{FC}$. The FC determines a sub-band. Specifically, $\Delta f_{FC}$ is the size of the sub-band.

Sub-channel: a group of TFCs within one FC, to which successive data is allocated.

Figure 4:
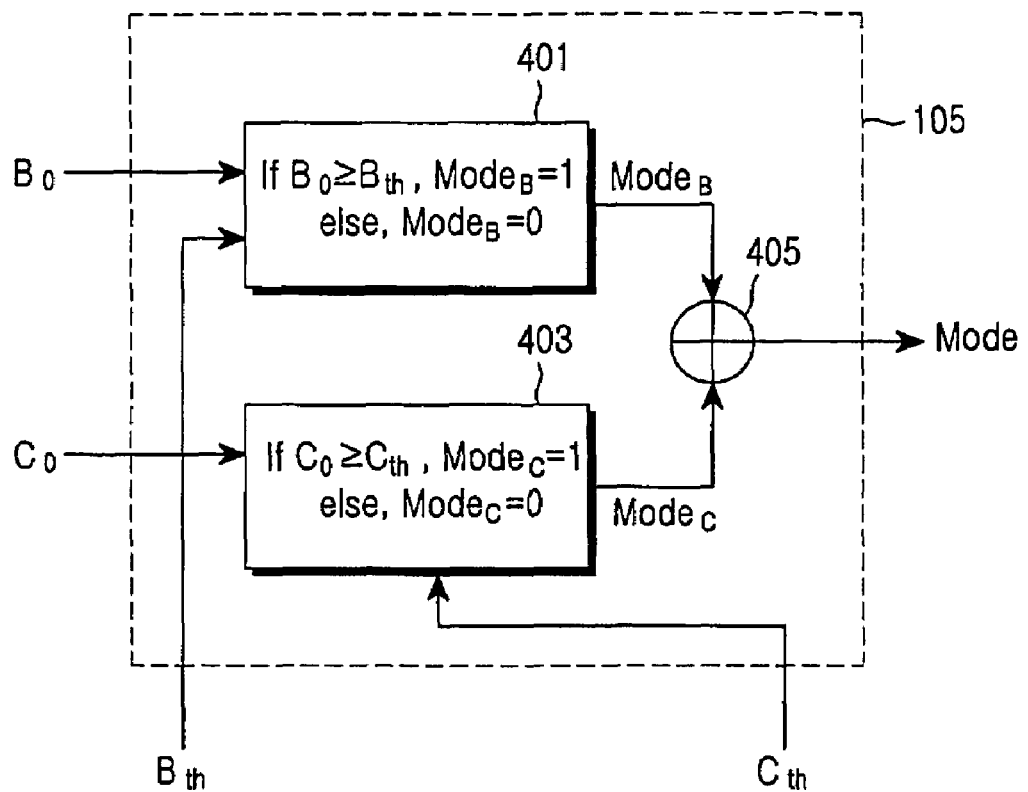
FIG. 4 is a detailed block diagram illustrating a transmission mode decider illustrated in FIG. 1.

FIG. 4 is a detailed block diagram illustrating the transmission mode decider 105 illustrated in FIG. 1. Under the presumption that sub-band #0 is allocated to the receiver, a method of determining the transmission mode for sub-band #0 will be described with reference to FIG. 4.

As described above, $B_0$ is a secondary statistical value representing a frequency-domain channel variation in a time-frequency area defined by sub-band #0 and a predetermined time period. While a variance serves as the secondary statistical value in the embodiment of the present invention, any other secondary statistical value can be used instead.

Referring to FIG. 4, a first decider 401 compares $B_0$ received from the mobile station with the threshold $B_{th}$. If $B_0$ is equal to or greater than $B_{th}$, the first decider 401 outputs $MODE_B$=1 and otherwise, it outputs $MODE_B$=0. That is, when $B_0$ representing a channel variation in frequency (i.e. frequency selectivity) is large, a frequency diversity gain is larger than an AMC gain and thus the diversity mode is selected. "1" of $MODE_B$=1 indicates the diversity mode and "0" of $MODE_B$=0 indicates the AMC mode. $B_{th}$ is a predetermined value that may vary depending on system requirements.

As described above, $C_0$ is a secondary statistical value representing a channel variation in time in the area defined by sub-band #0 and the predetermined time period. While a variance serves as the secondary statistical value in the embodiment of the present invention, any other secondary statistical value can be used instead. Because every sub-band experiences almost the same channel variation in time, it is assumed that all mobile stations feed back $C_0$ calculated for a predetermined sub-band (e.g. sub-band #0) to the base station. It can be further contemplated that $C_0$ calculated for a sub-band now in use for communications is fed back to the base station.

A second decider 403 compares $C_0$ received from the mobile station with the threshold $C_{th}$. If $C_0$ is equal to or greater than $C_{th}$, the second decider 403 outputs $MODE_C$=1 and otherwise, it outputs $MODE_C$=0. That is, when $C_0$ representing a channel variation in time (i.e. time selectivity) is large, a frequency diversity gain is larger than an AMC gain and thus the diversity mode is selected. "1" of $MODE_C$=1 indicates the diversity mode and "0" of $MODE_C$=0 indicates the AMC mode. $C_{th}$ is a predetermined value that may vary depending on system requirement.

An OR gate 405 OR-operates MODE$_B$ and MODE$_C$. Accordingly, if at least one of MODE$_B$ and MODE$_C$ is 1, the OR gate 405 outputs MODE=1 and if both are 0s, it outputs MODE=0. That is, if at least one of the frequency selectivity and the time selectivity is greater than the threshold, the diversity mode is selected and if both the selectivities are less than the thresholds, the AMC mode is selected.

While the mobile station is responsible for calculating B$_0$ and C$_0$ and reports the values to the base station in the above-described embodiment of the present invention, it can be further considered as another embodiment that the mobile station feeds back the channel estimates calculated by the channel estimators 207 to 209 and the base station itself calculates B$_0$ and C$_0$ using the channel estimates.

Figure 5:
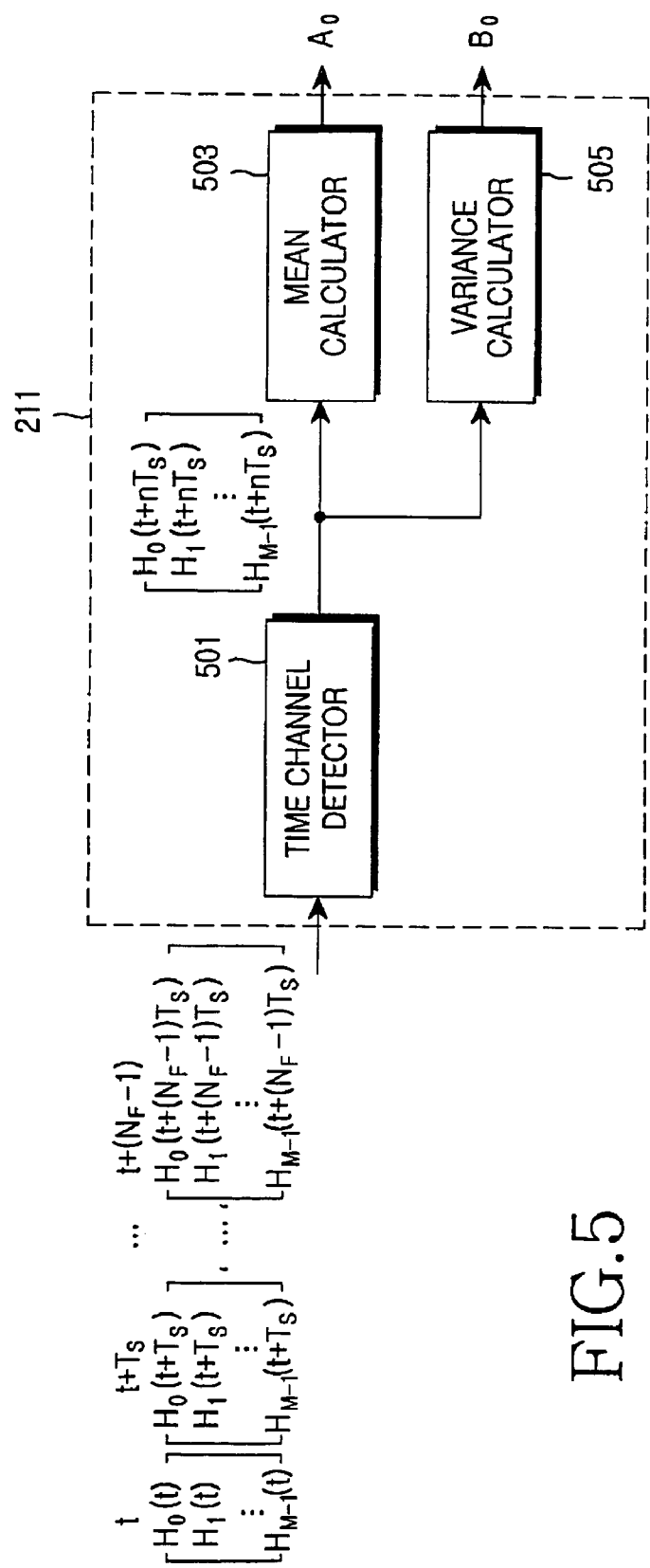
FIG. 5 is a detailed block diagram illustrating a frequency-domain CQI (Channel Quality Indicator) generator illustrated in FIG. 2.

FIG. 5 is a detailed block diagram illustrating the frequency-domain CQI generator 211 illustrated in FIG. 2. Referring to FIG. 5, a time channel detector 501 detects channel estimates for a predetermined time t+nT$_s$ among the channel estimates (see Equation (1)) calculated by the channel estimator 207 illustrated in FIG. 2. n is one of 0, 1, ..., N$_F$-1. A mean calculator 503 calculates the mean A$_0$ of the channel estimates for t+nT$_s$ received from the time channel detector 501. The mean can be an arithmetic mean, a geometric mean, or any other representative value. A$_0$ is fed back to the base station for use in determining an MCS for the AMC mode operation.

A variance calculator 505 calculates the secondary statistic value B$_0$ of the channel estimates for t+nT$_s$ received from the time channel detector 501. A variance is assumed as the secondary statistical value. B$_0$ is fed back to the base station for use in deciding on the AMC mode or the diversity mode. Also, B$_0$ can be used in deciding on the MCS for the AMC mode operation.

Figure 6:
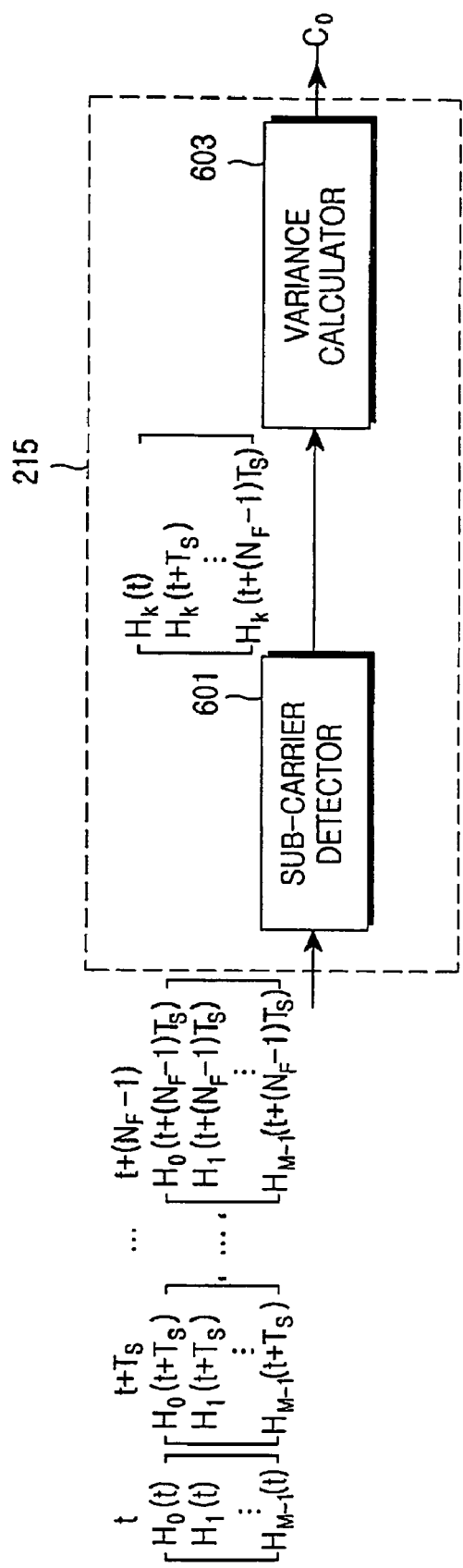
FIG. 6 is a detailed block diagram illustrating a channel variation measurer illustrated in FIG. 2.

FIG. 6 is a detailed block diagram illustrating the channel variation measurer 215 illustrated in FIG. 2. Referring to FIG. 6, a sub-carrier detector 601 detects the channel estimates of a predetermined sub-carrier k among the channel estimates (see Equation (1)) calculated by the channel estimator 207 illustrated in FIG. 2. k is one of 0, 1, ..., M-1. A variance calculator 603 calculates the secondary statistic value C$_0$ of the channel estimates of the sub-carrier k received from the sub-carrier detector 601. A variance is assumed as the secondary statistical value. C$_0$ is fed back to the base station for use in deciding on the AMC mode or the diversity mode. Also, C$_0$ can be used in deciding on the MCS level for the AMC mode operation.

Figure 7:
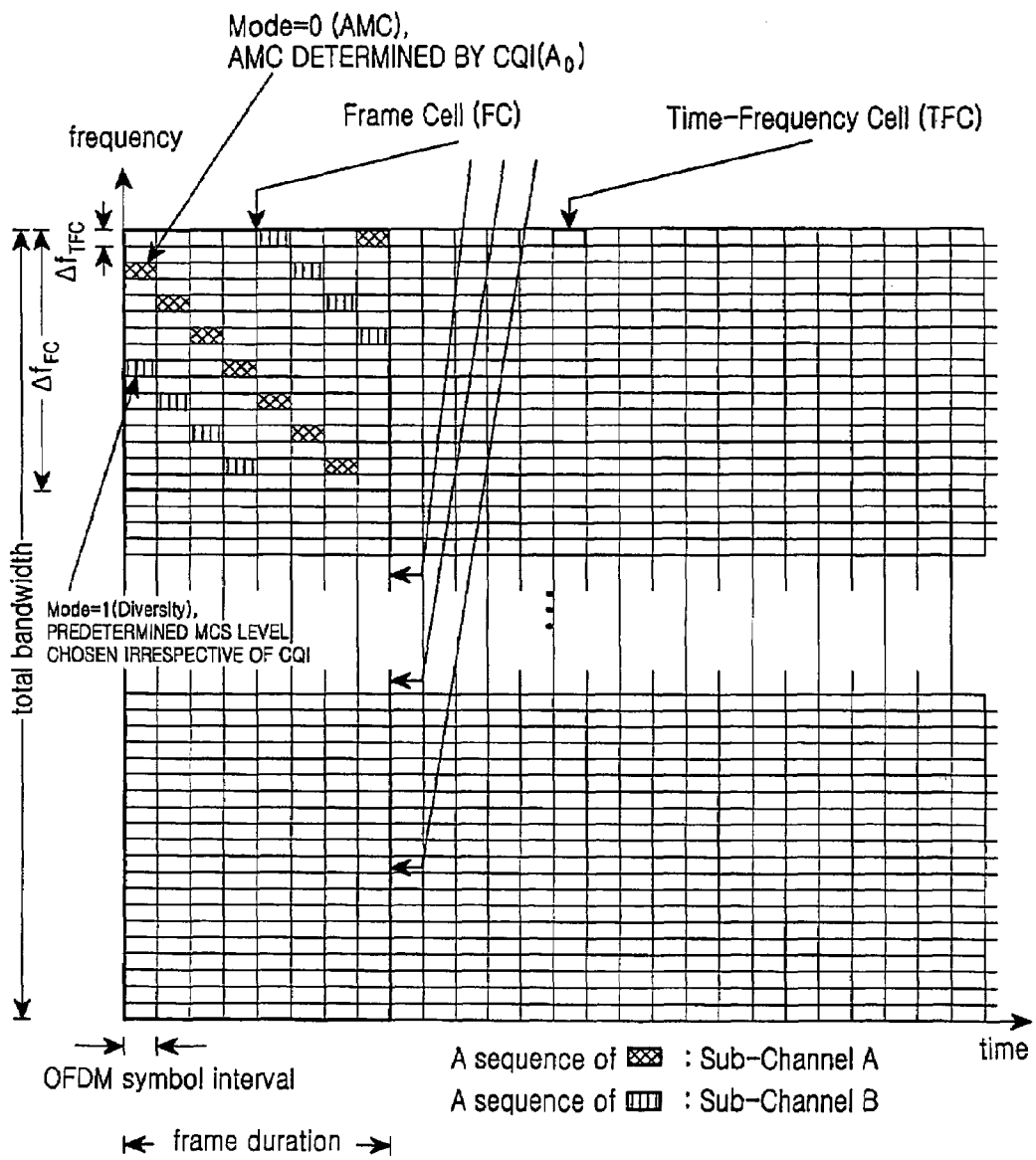
FIG. 7 illustrates data mapping in an AMC mode and a diversity mode in the OFDMA-CDM system according to the embodiment of the present invention.

FIG. 7 illustrates data mapping in the AMC mode and the diversity mode in the OFDMA-CDM system according to an embodiment of the present invention.

If the transmission mode decider illustrated in FIG. 4 outputs 0 as a MODE value, the base station operates in the AMC mode. In this mode, data mapping is basically data hopping from one TFC to another within an FC, as illustrated in FIG. 3. In the AMC-mode operation, before mapping to a TFC, transmission data is encoded and modulated at a determined AMC level by the frequency-domain CQI, i.e., A$_0$ calculated in the frequency-domain CQI generator of FIG. 5.

However, if the MODE value is 1, the base station operates in the diversity mode. In the diversity mode, data mapping is basically data hopping from one TFC to another within an FC, as illustrated in FIG. 3. In view of the diversity-mode operation, transmission data mapped to each TFC has been encoded and modulated at an AMC level predetermined, irrespective of channel state. The AMC level can be the lowest-order MCS.

As to sub-channel A allocated to user A in FIG. 7, the transmitter starts with the frequency band of the third TFC from the top in a first OFDM symbol period, hops to the frequency band of the fifth TFC in a second OFDM symbol period, and hops to the frequency band of the seventh TFC in a third OFDM symbol period. That is, data hopping is done in time and in frequency. Accordingly, the base station operates basically in the diversity mode according to the embodiment of the present invention.

During communications in progress, user A reports to the base station a frequency-domain channel state and a time-domain channel state on an FC basis. The base station then analyzes the feedback information. If both the channel states are good, the base station operates in the AMC mode involving hopping and AMC level. If at least one of the channel states is bad, the base station operates in the diversity mode involving hopping only.

Figure 8:
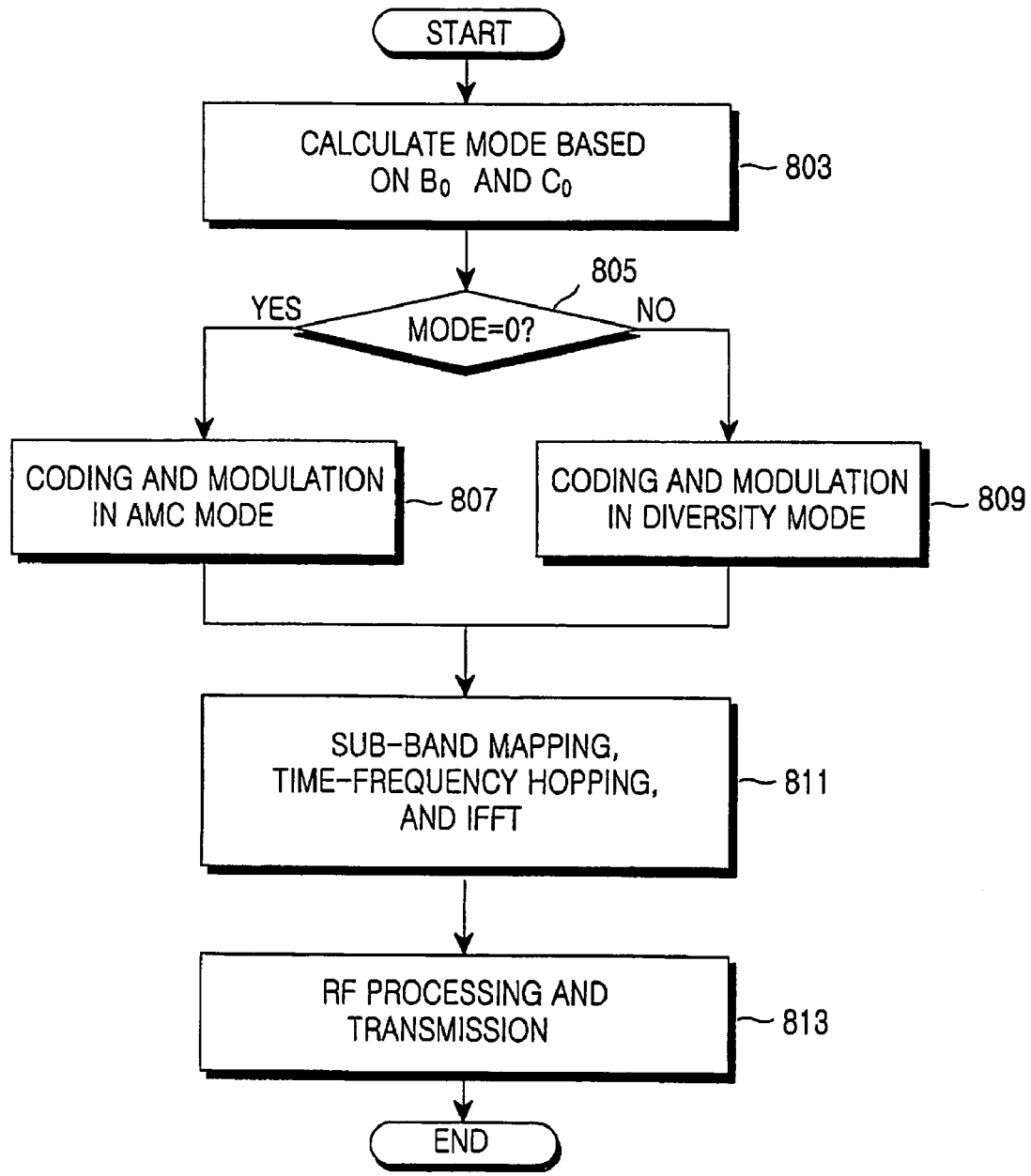
FIG. 8 is a flowchart illustrating a transmission procedure in the base station apparatus in the OFDMA-CDM system according to an embodiment of the present invention.

FIG. 8 is a flowchart illustrating a transmission procedure in the base station apparatus in the OFDMA-CDM system according to an embodiment of the present invention. Referring to FIG. 8, the base station apparatus determines a MODE value by comparing B$_0$ (a channel variation in a predetermined frequency band) and C$_0$ (a channel variation in a predetermined time period) received from the mobile station with predetermined thresholds in step 803.

In step 805, the base station apparatus determines whether the MODE value is 0 or 1. If the MODE value is 0, the base station apparatus proceeds to step 807 and if the MODE value is 1, the base station apparatus proceeds to step 809. As described above, if at least one of B$_0$ and C$_0$ is equal to or larger than its threshold, the MODE value is set to 1. If both B$_0$ and C$_0$ are less than the thresholds, the MODE value is set to 0. In the former case, the diversity mode is selected and in the latter case, the AMC mode is selected.

In step 807, the base station apparatus operates in the AMC mode. More specifically, the base station apparatus determines an MCS level according to the frequency-domain CQI and encodes and modulates transmission data according to the MCS level.

In step 809, the base station apparatus operates in the diversity mode. More specifically, the base station apparatus selects a predetermined AMC level (e.g. the lowest AMC level) and encodes and modulates transmission data in a coding and modulation scheme corresponding to the AMC level.

After step 807 or step 809, the base station apparatus maps the modulated data to a sub-band allocated to the mobile station, spreads the modulated data in the sub-band, maps the spread data to TFCs according to a predetermined rule, and IFFT-processes the TFC-mapped data, for OFDM modulation in step 811. Thereafter, the base station apparatus serializes the OFDM-modulated data, converts the serial data to an analog signal, converts the analog signal to an RF signal, and transmits the RF signal to the mobile station in step 813.

Figure 9:
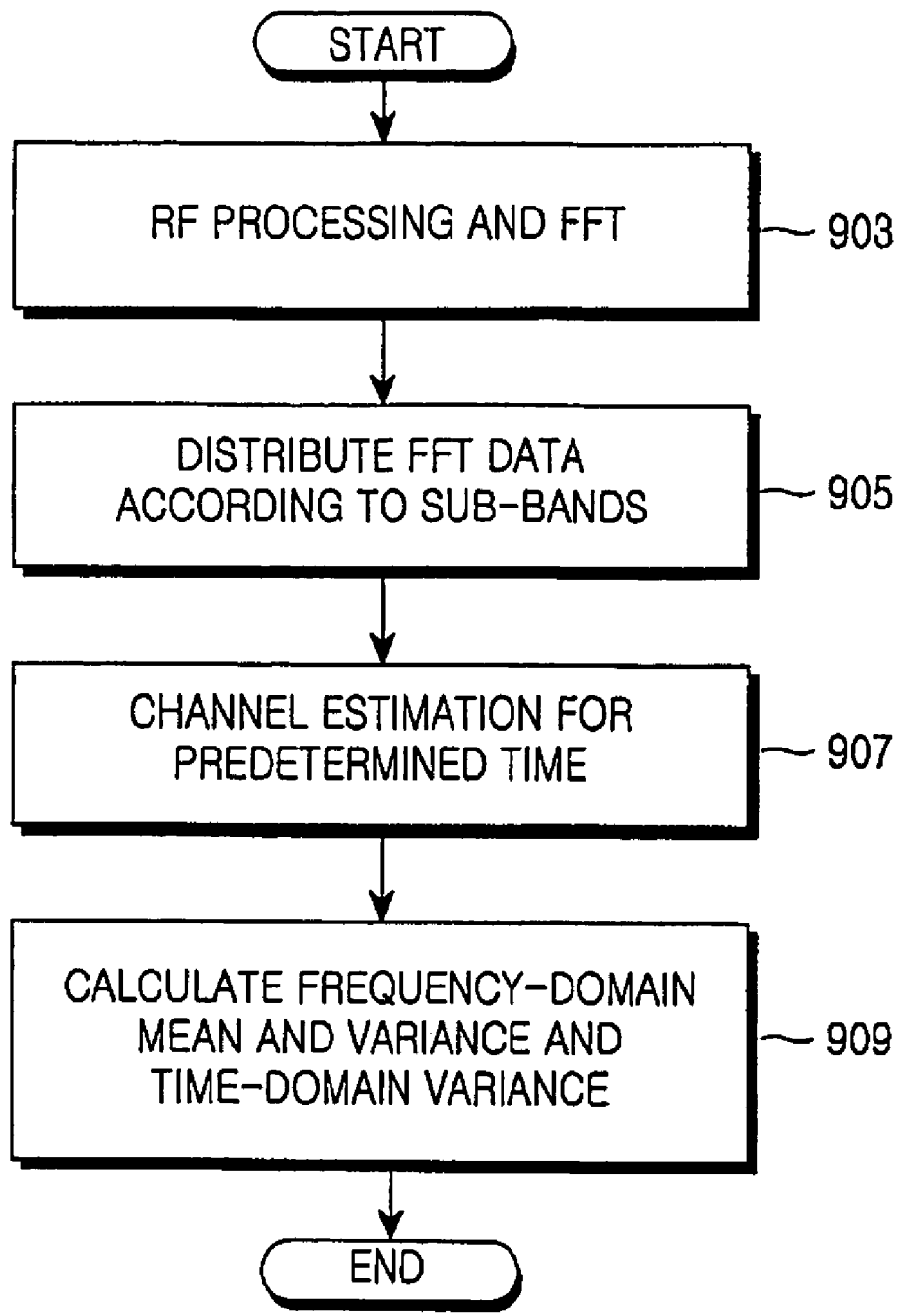
FIG. 9 is a flowchart illustrating a reception procedure in the mobile station apparatus in the OFDMA-CDM system according to an embodiment of the present invention.

FIG. 9 is a flowchart illustrating a reception procedure in the mobile station apparatus in the OFDMA-CDM system according to an embodiment of the present invention. Referring to FIG. 9, in step 903, the mobile station apparatus converts an RF signal received through the antenna to a baseband signal, converts the baseband analog signal to a digital signal, parallelizes the digital signal, and FFT-processes the parallel signals for OFDM demodulation. The mobile station apparatus distributes the OFDM-demodulated data to the band despreaders 217 to 219 and the channel estimators 207 to 209 according to their matched sub-bands in step 905.

In step 907, the mobile station apparatus performs channel estimation on the total frequency band for a predetermined time period by use of the channel estimators 207 to 209. The mobile station apparatus calculates the mean $A_0$ and variance $B_0$ of the channel estimates of a frequency using the channel estimates resulting from the channel estimation in step 909. At the same time, the mobile station apparatus calculates the variance $C_0$ of the channel estimates of a time period. $A_0$, $B_0$ and $C_0$ are fed back to the base station.

Thereafter, the mobile station apparatus despreads the OFDM-demodulated data and recovers the original data through demodulation and decoding of the despread data.

Figure 10:
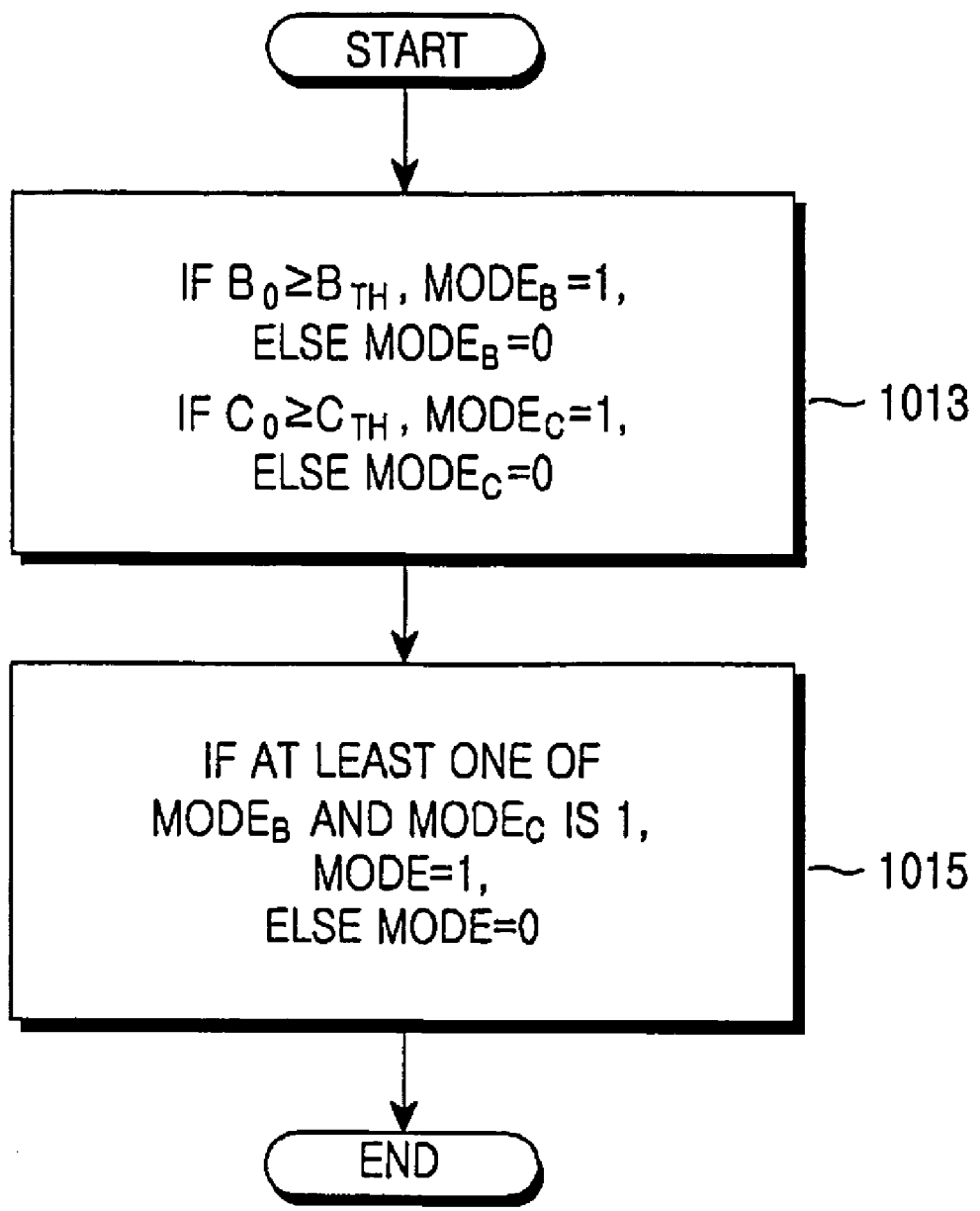
FIG. 10 is a flowchart illustrating an operation of the transmission mode decider in the base station apparatus in the OFDMA-CDM system according to an embodiment of the present invention.

FIG. 10 is a flowchart illustrating an operation of the transmission mode decider 105 in the base station apparatus in the OFDMA-CDM system according to the embodiment of the present invention. Referring to FIG. 10, in step 1013, the transmission mode decider 105 compares $B_0$ (a channel variation in frequency) received from the mobile station with the threshold $B_{th}$. If $B_0$ is equal to or greater than $B_{th}$, the transmission mode decider 105 outputs $MODE_B=1$, and otherwise, the transmission mode decider 105 outputs $MODE_B=0$. Also, the transmission mode decider 105 compares $C_0$ (a channel variation in time) with the threshold $C_{th}$. If $C_0$ is equal to or greater than $C_{th}$, the transmission mode decider 105 outputs $MODE_C=1$, and otherwise, it outputs $MODE_C=0$.

In step 1015, the transmission mode decider 105 generates a MODE value by OR-operating $MODE_B$ and $MODE_C$. Accordingly, if at least one of $MODE_B$ and $MODE_C$ is 1, MODE=1, representing the diversity mode, and if both are 0s, MODE=0, representing the AMC mode.

Figure 11:
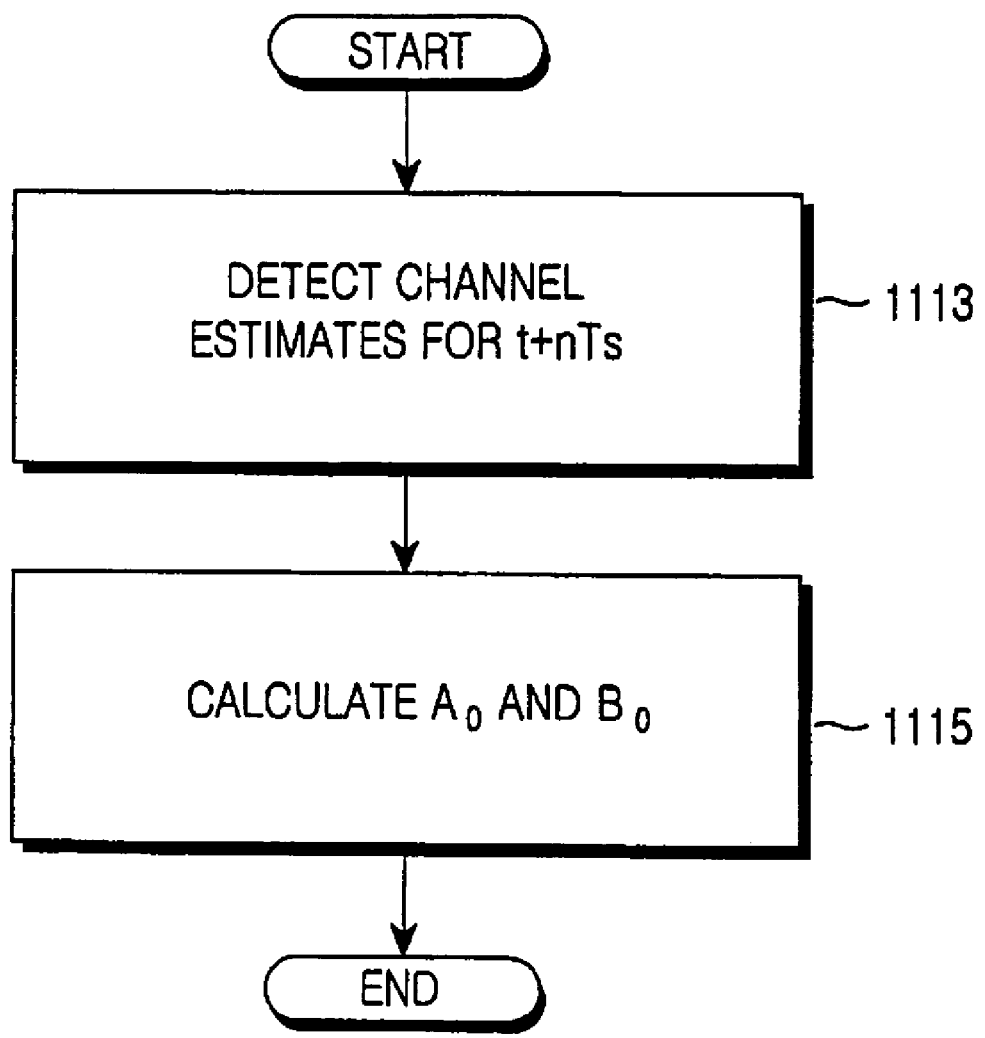
FIG. 11 is a flowchart illustrating an operation of the frequency-domain CQI generator in the mobile station apparatus in the OFDMA-CDM system according to an embodiment of the present invention.

FIG. 11 is a flowchart illustrating an operation of the frequency-domain CQI generator 211 in the mobile station apparatus in the OFDMA-CDM system according to the embodiment of the present invention. Referring to FIG. 11, the frequency-domain CQI generator 211 detects the channel estimates for the predetermined time $t+nT_s$ among the channel estimates (see Equation (1)) calculated by the channel estimator 207 illustrated in FIG. 2 in step 1113. In step 1115, the frequency-domain CQI generator 211 calculates the mean $A_0$ and the secondary statistic value $B_0$ of the channel estimates for $t+nT_s$. $B_0$ can be a variance. $A_0$ and $B_0$ are fed back to the base station for use in deciding on the AMC mode or the diversity mode, and an MCS level (i.e. AMC level).

Figure 12:
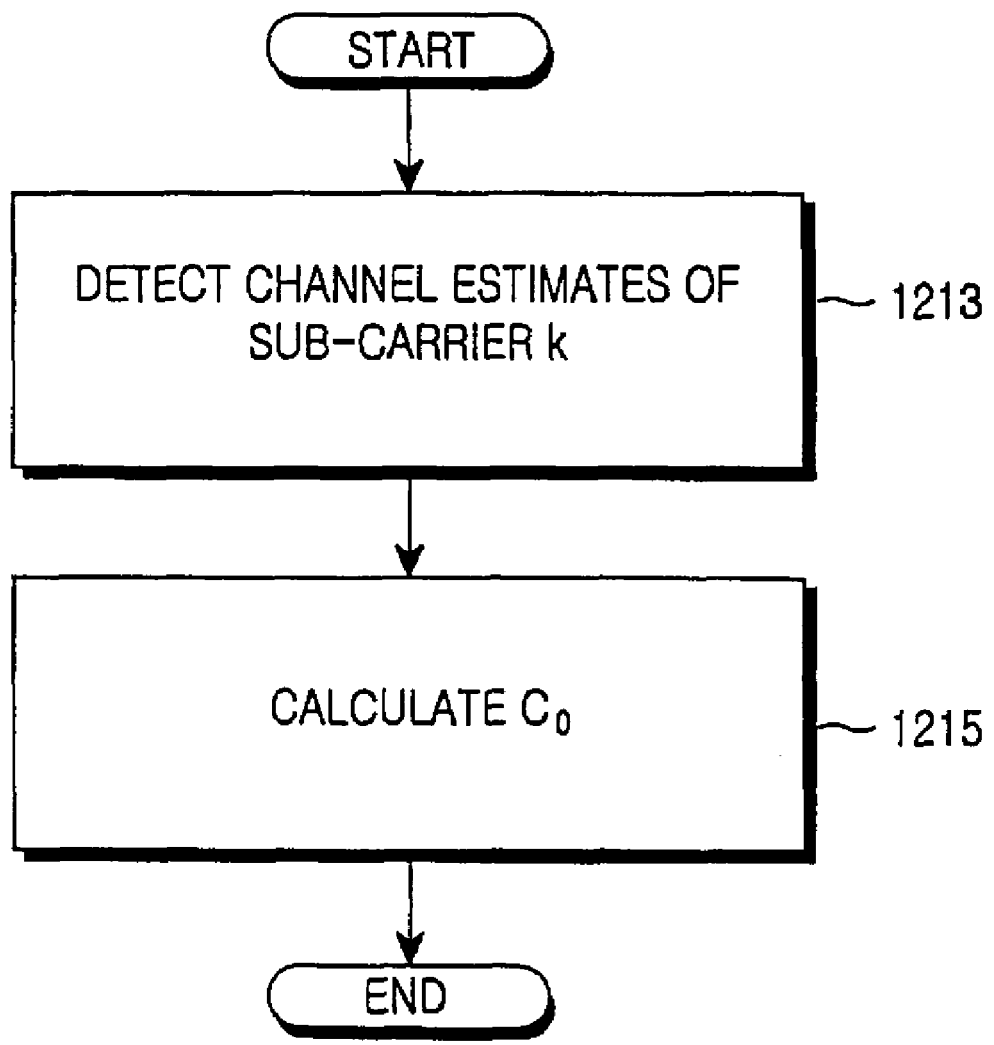
FIG. 12 is a flowchart illustrating an operation of the channel variation measurer in the mobile station apparatus in the OFDMA-CDM system according to an embodiment of the present invention.

FIG. 12 is a flowchart illustrating an operation of the channel variation measurer 215 in the mobile station apparatus in the OFDMA-CDM system according to the embodiment of the present invention. Referring to FIG. 12, in step 1213, the channel variation measurer 215 detects the channel estimates of the predetermined sub-carrier k among the channel estimates (see Equation (1)) calculated by the channel estimator 207 illustrated in FIG. 2. k is one of 0, 1, ..., M-1. The channel variation measurer 215 calculates the secondary statistic value $C_0$ of the channel estimates of the sub-carrier k in step 1215. A variance can serve as the secondary statistical value. $C_0$ is fed back to the base station for use in deciding on the AMC mode or the diversity mode. Also, $C_0$ can be used in deciding on the MCS level for the AMC mode operation.

As described above, the present invention provides a method of adaptively changing a transmission scheme according to a varying channel environment in a system in which the time-frequency domain is divided into a plurality of sub-bands and sub-time periods. Therefore, limited radio resources are effectively used and the system operates more stably.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A communication method for a mobile station in a broadband wireless communication system in which a total frequency band of sub-carriers is divided into a plurality of sub-bands and frame cells (FCs) are defined, each FC being defined by one sub-band and a predetermined time period, and having at least one time-frequency cell (TFC) defined by one orthogonal frequency division multiplexing (OFDM) symbol and a predetermined number of subcarriers, the method comprising the steps of:

OFDM-demodulating a received signal by fast Fourier transform (FFT)-processing the received signal and separating the OFDM-demodulated data according to the sub-bands;

extracting pilot data from the separated OFDM-demodulated data;

generating channel estimates of each of the sub-bands for the predetermined time period using the extracted pilot data;

calculating a channel mean (A) and a channel secondary statistical value (B) of each of the sub-bands using channel estimates for a predetermined time among the generated channel estimates;

calculating a channel secondary statistical value (C) of at least one of the sub-bands using channel estimates for a predetermined frequency among the generated channel estimates; and transmitting, to a base station, channel measurement information including the calculated one or more mean value (s) (A), the calculated one or more secondary statistical value(s) (B), and the calculated one or more secondary statistical value(s) (C); detecting data of allocated TFCs from the OFDM-demodulated data; generating a symbol sequence by despreading the detected data with a predetermined spreading code; and recovering data by demodulating and decoding the symbol sequence;

wherein the one or more mean value(s) (A) represents an average frequency-domain channel states, the one or more secondary statistical value(s) (B) represents a channel variation in frequency-domain, and the one or more secondary statistical value(s) (C) represents a channel variation in time-domain.

2. A transmission method in a broadband wireless communication system in which a total frequency band of sub-carriers is divided into a plurality of sub-bands and frame cells (FCs) are defined, each FC corresponding to resources defined by one sub-band and a predetermined time period, the method comprising the steps of:

receiving, from a receiver, a secondary statistical value (B) of sub-carrier channel estimates detected at a predetermined time in an FC allocated to the receiver, a secondary statistical value (C) of sub-carrier channel estimates detected for a predetermined sub-carrier in a predetermined FC, and a mean channel quality indicator (CQI) of the sub-carrier channel estimates detected at the predetermined time;

determining if a frequency-domain channel state is good by comparing the secondary statistical value (B) with a predetermined threshold ($B_{th}$);

determining if a time-domain channel state is good by comparing the secondary statistical value (C) with a predetermined threshold ($C_{th}$);

determining a transmission mode to be a first mode, if both the frequency-domain channel state and the time-domain channel state are good;

determining the transmission mode to be a second mode, if at least one of the frequency-domain channel state and the time-domain channel state is bad;

selecting a coding and modulation scheme according to a frequency-domain channel quality indicator (CQI) received from the receiver, if the determined transmission mode is the first mode selecting a predetermined coding and modulation scheme, if the determined transmission mode is the second mode; encoding and modulating transmission data in the selected coding and modulation scheme; mapping the modulated data to an allocated sub-band; spreading the modulated data mapped to the sub-band with a predetermined spreading code; mapping the spread data to a predetermined time-frequency area in a predetermined hopping rule; inverse fast Fourier transform (IFFT)-processing the mapped data; and transmitting the IFFT data; wherein the secondary statistical values B and C are variances.

3. The transmission method of claim 2, wherein the time-frequency area includes a predetermined number of sub-carriers and is as long as an OFDM symbol.

4. The transmission method of claim 2, wherein the first mode is an adaptive modulation and coding (AMC) mode and the second mode is a diversity mode.

5. A transmitting apparatus in an orthogonal frequency division multiple access-code division multiplexing (OFDMA-CDM) system in which a total frequency band of sub-carriers is divided into a plurality of sub-bands and frame cells (FCs) are defined, each of the FCs corresponding to resources defined by one sub-band and a predetermined time period, and having at least one time-frequency cell (TFC) defined by one orthogonal frequency division multiplexing (OFDM) symbol and a predetermined number of sub-carriers, the apparatus comprising:

a transmission mode decider for determining a transmission mode based on frequency-domain channel measurement information and time-domain channel measurement information received from a receiver; a coder and modulator for selecting a coding and modulation scheme according to a frequency-domain channel quality indicator (CQI) received from the receiver, if the determined transmission mode is a first mode, selecting a predetermined coding and modulation scheme, if the determined transmission mode is a second mode, and encoding and modulating input transmission data in the selected coding and modulation scheme; a band distributor for outputting the modulated data to a band spreader matched to an allocated sub-band; a plurality of band spreaders matched to sub-bands in a one-to-one correspondence, for spreading data received from the band distributor with a predetermined spreading code; a plurality of time-frequency hoppers matched to the plurality of the band spreaders in a one-to-one correspondence, for mapping data received from the matched band spreaders to a predetermined TFC in a predetermined hopping; and an inverse fast Fourier transform (IFFT) processor for IFFT-processing the data received from the plurality of the time-frequency hoppers;

wherein the frequency-domain channel measurement information is a secondary statistical value B of sub-carrier channel estimates detected at a redetermined time in an FC allocated to the receiver, and the time-domain channel measurement information is a secondary statistical value (C) of sub-carrier channel estimates detected for a predetermined sub-carrier in a predetermined FC, and wherein the transmission mode decider comprises,
a first decider for determining if a frequency-domain channel state is good by comparing the secondary statistical value (B) with a predetermined threshold ($B_{th}$),
a second decider for determining if a time-domain channel state is good by comparing the secondary statistical value (C) with a predetermined threshold ($C_{th}$), and
a decider for determining the transmission mode to be the first mode, if both the frequency-domain channel state and the time-domain channel state are good, and determining the transmission mode to be the second mode, if at least one of the frequency-domain channel state and the time-domain channel state is bad; wherein secondary statistical values (B) and (C) are variances.

6. The transmitting apparatus of claim 5, wherein the first mode is an adaptive modulation and coding (AMC) mode and the second mode is a diversity mode.

7. A mobile station apparatus in an orthogonal frequency division multiple access-code division multiplexing (OFDMA-CDM) system in which a total frequency band of sub-carriers is divided into a plurality of sub-bands and frame cells (FCs) are defined, each of the FCs corresponding to resources defined by one sub-band and a predetermined time period, and having at least one time-frequency cell (TFC) defined by one orthogonal frequency division multiplexing (OFDM) symbol and a predetermined number of sub-carriers, the apparatus comprising:

a fast Fourier transform (FFT) processor for OFDM-demodulating a received signal by FFT-processing the received signal and separating the OFDM-demodulated data according to the sub-bands;

a plurality of channel estimators matched to the plurality of sub-bands in a one-to-one correspondence, for extracting pilot data from the OFDM-demodulated data received from the FFT processor and performing channel estimation on FCs allocated to the channel estimators using the extracted pilot data;

a plurality of frequency-domain channel quality indicator (CQI) generators matched to the plurality of channel estimators in a one-to-one correspondence, for calculating a channel mean (A) and a channel secondary statistical value (B) in frequency-domain of each of the sub-bands using the channel estimates from the matched channel estimators;

a channel variation measurer for receiving channel estimates from a predetermined channel estimator, and calculating a channel secondary statistical value (C) of each of the sub-bands in time-domain using the received channel estimates; a transmitter for transmitting, to a base station, channel measurement information including the calculated one or more mean value(s) (A) and the calculated one or more secondary statistical value(s) (B) received from the frequency-domain CQI generator(s) and the calculated one or more secondary statistical value (C) received from the channel variation measurer; a plurality of time-frequency hopping selectors matched to the plurality of sub-bands in a one-to-one correspondence, for detecting data of allocated TFCs from the OFDM-demodulated data received from the FFT; a plurality of band despreaders matched to the plurality of time-frequency hopping selectors in a one-to-one correspondence, for generating symbols by despreading the data received from the matched time-frequency hopping selectors with a predetermined spreading code; and a demodulator and decoder for recovering data by demodulating and decoding the symbols received from the plurality of band despreaders.

8. The mobile station apparatus of claim 7, wherein each of the plurality of frequency-domain CQI generators comprises:
- a detector for detecting the channel estimates for the predetermined time among the received channel estimates;
- a mean calculator for calculating the mean of the channel estimates received from the detector; and
- a variance calculator for calculating the variance of the channel estimates received from the detector.

9. The mobile station apparatus of claim 7, wherein the channel variation measurer comprises:
- a detector for detecting the channel estimates of the predetermined frequency among the received channel estimates; and
- a variance calculator for calculating the variance of the channel estimates received from the detector.

10. The mobile station apparatus of claim 7, wherein the one or more secondary statistical value(s) (B) represents frequency-domain channel variations.

11. The mobile station apparatus of claim 7, wherein the one or more secondary statistical value(s) (C) represents a time-domain channel variation.

* * * * *